US008835072B2

(12) United States Patent
Park et al.

(10) Patent No.: US 8,835,072 B2
(45) Date of Patent: Sep. 16, 2014

(54) SOLID OXIDE FUEL CELL STACKS AND FUEL CELL MODULE HAVING THE SAME

(75) Inventors: Kwang-Jin Park, Yongin-si (KR);
Jun-Won Suh, Yongin-si (KR);
Sang-Jun Kong, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 71 days.

(21) Appl. No.: 13/542,477

(22) Filed: Jul. 5, 2012

(65) Prior Publication Data
US 2013/0089804 A1 Apr. 11, 2013

(30) Foreign Application Priority Data
Oct. 5, 2011 (KR) .......................... 10-2011-0101095

(51) Int. Cl.
*H01M 8/24* (2006.01)
*H01M 2/20* (2006.01)
(52) U.S. Cl.
CPC ............ *H01M 8/243* (2013.01); *H01M 8/2465* (2013.01); *Y02E 60/521* (2013.01); *Y02E 60/50* (2013.01); *Y02E 60/525* (2013.01)
USPC ............ 429/466; 429/467; 429/469; 429/470
(58) Field of Classification Search
CPC .................................. H01M 8/24; H01M 2/20
USPC .................. 429/452–471, 517–522, 507–511
See application file for complete search history.

(56) References Cited

U.S. PATENT DOCUMENTS

| 7,785,747 | B2 * | 8/2010 | Armstrong et al. ........... 429/459 |
| 2002/0187382 | A1 * | 12/2002 | Nishiumi et al. ................ 429/34 |
| 2003/0148160 | A1 * | 8/2003 | Song et al. ....................... 429/31 |
| 2004/0234832 | A1 * | 11/2004 | Kuroishi et al. ................. 429/31 |
| 2008/0152991 | A1 * | 6/2008 | Yoshitomi et al. .............. 429/34 |
| 2010/0098977 | A1 | 4/2010 | Ryu et al. |
| 2010/0136381 | A1 | 6/2010 | Yang |
| 2011/0171554 | A1 * | 7/2011 | Hayashi et al. ................ 429/456 |

FOREIGN PATENT DOCUMENTS

| JP | 2010-103076 A | 5/2010 |
| KR | 2010-0062911 A | 6/2010 |
| WO | WO 2010038869 A1 * | 4/2010 ............ H01M 8/12 |

* cited by examiner

*Primary Examiner* — Patrick Ryan
*Assistant Examiner* — Kiran Quraishi
(74) *Attorney, Agent, or Firm* — Knobbe Martens Olson & Bear LLP

(57) ABSTRACT

A solid oxide fuel cell stack is disclosed. The solid oxide fuel cell stack may include a cell array, a pair of planar current collecting members, first and second terminal portions, and a pair of electric insulating members. A plurality of interconnector-type unit cells may be electrically connected in parallel to form a bundle, and a plurality of bundles may be electrically connected in series. The pair of the planar current collecting members may be electrically connected electrically to the plurality of bundles and configured to collect current. The first and second terminal portions contact the current collecting members. The pair of insulating members has first through-holes through which the first and second terminal portions pass, and to the insulating members are formed outside the pair of the current collecting members.

18 Claims, 9 Drawing Sheets

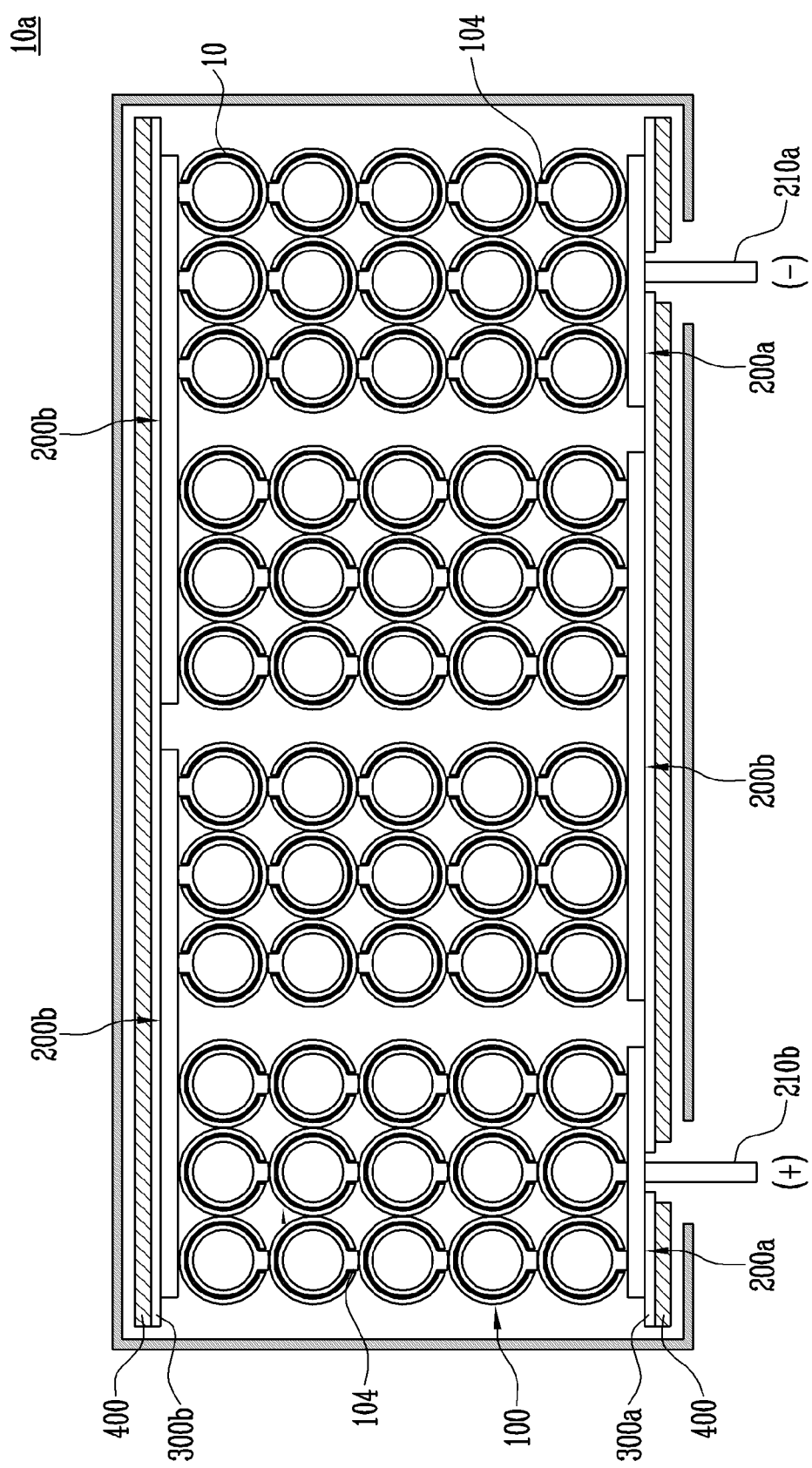

SOLID OXIDE FUEL CELL STACKS AND FUEL CELL MODULE HAVING THE SAME

CROSS-REFERENCE TO RELATED APPLICATIONS

This application claims priority to and the benefit of Korean Patent Application No. 10-2011-0101095, filed on Oct. 5, 2011, in the Korean Intellectual Property Office, the entire content of which is incorporated herein by reference.

BACKGROUND

1. Field

The present disclosure relates to solid oxide fuel cell stacks and a fuel cell module having the same. The disclosure also includes a facilitating electrical connection between the fuel cell stacks and the fuel cell module.

2. Description of the Related Technology

Fuel cells may be classified depending upon electrolyte type. Since fuel cells have various power ranges, a suitable fuel cell can be selected according to its proposed use. Among solid oxide fuel cells, it is relatively easy to control electrolyte position without risk of exhausting the electrolyte. Further, since solid oxide fuel cells resist corrosion, solid oxide fuel cells may have extended lifetimes. For these reasons, solid oxide fuel cells are seriously considered for distributed generation, commerce and domestic use.

Voltage ranges of fuel cell unit cells are often not as high as required for practical use. Therefore, in order to obtain increased voltages required, the rated voltage and capacity of the fuel cells are designed by electrically connecting a plurality of unit cells either in series or in parallel to each other.

SUMMARY OF CERTAIN INVENTIVE ASPECTS

Some aspects disclosed herein provide a structure of fuel cell stacks, which can facilitate electrical connection between the fuel cell stacks and reduce electrical loss occurring in a connection portion between the fuel cell stacks.

Some aspects disclosed herein also provide fuel cell stacks electrically connected in series, in parallel, or a combination of series and parallel electrical connections and a fuel cell module having the fuel cell stacks.

According to another aspect, a bidirectional terminal type solid oxide fuel cell stack is provided. The bidirectional terminal type solid oxide fuel cell stack includes, for example, a cell array, a current collecting member, a first terminal portion, a second terminal portion, and an insulating member.

In some embodiments, the cell array includes a plurality of interconnector-type unit cells electrically connected in parallel form bundles, and a plurality of bundles electrically connected in series. In some embodiments, the current collecting member includes a pair of planar current collecting members. In some embodiments, the pair of the planar current collecting members are respectively electrically connected to ends of each of the plurality of bundles and configured to collect current. In some embodiments, the first and second terminal portions are respectively provided to the current collecting members. In some embodiments, the insulating member is provided with a pair of planar insulating members. In some embodiments, the pair of planar insulating members have first through-holes through which the respective first and second terminal portions pass, and are respectively provided to outsides of the pair of the current collecting members. In some embodiments, the unit cell may include a first electrode layer, an electrolyte layer and a second electrode layer, sequentially laminated from an inside thereof. In some embodiments, the unit cell may include an interconnector electrically connected to the first electrode layer and exposed to an outside of the unit cell in the state that the interconnector is insulated from the second electrode layer. In some embodiments, the pair of the current collecting members may contact with the interconnector and the second electrode layer, respectively. In some embodiments, the solid oxide fuel cell stack further includes a pair of planar holders having second through-holes respectively formed therein and respectively provided to outsides of the pair of the insulating member. In some embodiments, fixing holes are formed at corresponding positions of the pair of the holders. In some embodiments, the solid oxide fuel cell stack further includes a fixing member inserted into the fixing holes and configured to fix an interval between the pair of the holders. In some embodiments, the solid oxide fuel cell stack further includes an outer case provided to surround outsides of the cell array and the holders. In some embodiments, the outer case includes third through-holes through which the respective first and second terminal portions are exposed to outsides thereof. In some embodiments, the unit cell is formed in a tubular shape. In some embodiments, the unit cell is formed in a flat-tubular shape. In some embodiments, the first and second terminal portions may be formed in a planar shape. In some embodiments, the first and second terminal portions are formed protruding in vertical directions from the respective current collecting members.

According to another aspect, there is provided a unidirectional terminal type fuel cell stack. The unidirectional terminal type fuel cell includes, for example, a cell array, a current collecting member, an auxiliary current collecting member, a first terminal portion, a second terminal portion, a first insulating member, and a second insulating member.

In some embodiments, the cell array includes a plurality of interconnector-type unit cells electrically connected in parallel form bundles, and a plurality of bundles electrically connected in series. In some embodiments, the current collecting member includes a pair of planar current collecting members, and the pair of the planar current collecting members are respectively electrically connected to ends of each of the plurality of bundles and configured to collect current. In some embodiments, an auxiliary current collecting member is formed in a planar shape and positioned so that two bundles connected in series contact with each other on the same plane. In some embodiments, the first and second terminal portions are respectively provided to the current collecting members. In some embodiments, the first insulating member has first through-holes through which the respective and second terminal portions pass, and is positioned outside the pair of the current collecting members. In some embodiments, the second insulating member is provided at the other side of the first insulating member, and is positioned outside the auxiliary current collecting member. In some embodiments, the unit cell may include a first electrode layer, an electrolyte layer and a second electrode layer, sequentially laminated from an inside thereof, and an interconnector connected to the first electrode layer and exposed to an outside of the unit cell such that the interconnector is insulated from the second electrode layer. In some embodiments, the first and second current collecting members may contact the interconnector and the second electrode layer, respectively. In some embodiments, the fuel cell stack further includes a first planar holder having second through-holes respectively formed therein and respectively provided to an outside of the first insulating member, and a second planar holder positioned outside the second insulating member. In some embodiments, fixing holes are formed at corresponding positions of the first and second holders, respectively. In some embodiments, the fuel cell stack further includes a fixing member inserted into the fixing holes and configured to fix an interval between the first and second holders. In some embodiments, the fuel cell stack further includes an outer case formed to surround outsides of the cell array and the first and second holders. In some embodiments, the outer case includes third through-holes through which the respective first and second terminal portions are exposed to outsides thereof. In some embodiments, the unit cell may be formed in a tubular shape. In some embodiments, the unit cell may be formed in a flat-tubular shape. In some embodiments, the first and second terminal portions may be formed in a planar shape. In some embodiments, the first and second terminal portions may protrude in vertical directions from the respective current collecting members.

According to another aspect, a solid oxide fuel cell module includes unidirectional terminal type fuel cell stacks. In some embodiments, the bidirectional terminal type fuel cell stacks are electrically connected in series.

According to another aspect, a solid oxide fuel cell module includes bidirectional terminal type fuel cell stacks and unidirectional terminal type fuel cell stacks. In some embodiments, the bidirectional and unidirectional terminal type fuel cell stacks are alternately electrically connected in series.

According to another aspect, a solid oxide fuel cell module includes bidirectional terminal type fuel cell stacks electrically connected in series and in parallel.

In some embodiments, since a plurality of fuel cell stacks can be electrically connected through two terminal portions formed on different sides of each of the fuel cell stacks, it is possible to reduce electrical loss occurring in an electrical connection portion between the fuel cell stacks and to provide a fuel cell module in which the fuel cell stacks are electrically connected using a relatively easy and simple method.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

FIG. 4C is a cross-sectional view showing a fuel cell stack according to still another embodiment of the present disclosure.

DETAILED DESCRIPTION OF CERTAIN INVENTIVE EMBODIMENTS

Figure 1:
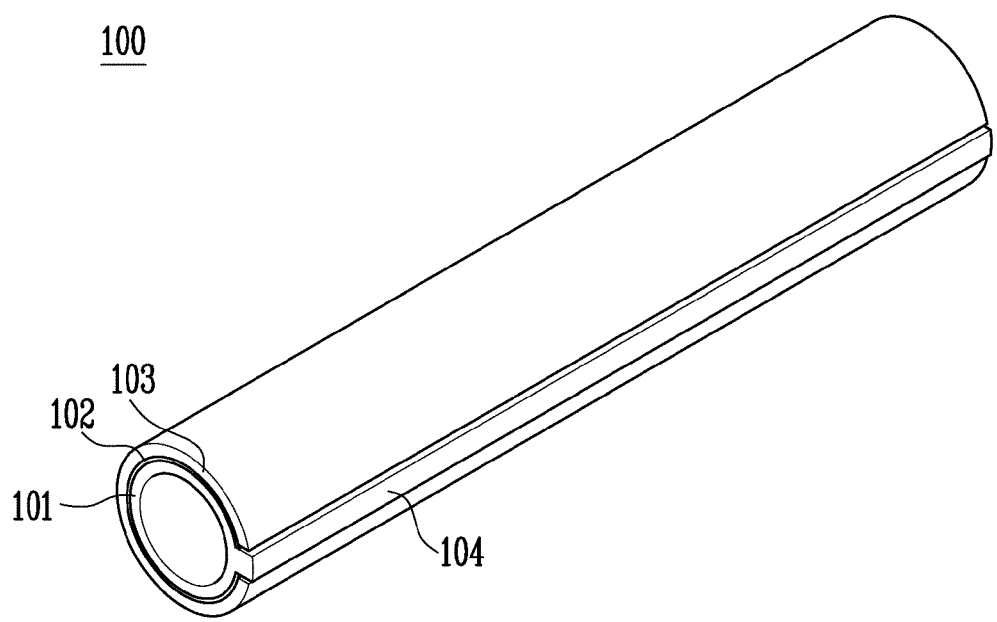
FIG. 1 is a schematic perspective view showing an interconnector-type unit cell.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

A general fuel cell may include, for example, a fuel converter (a reformer and a reactor) configured for reforming and supplying fuel and a fuel cell module. Here, the fuel cell module refers to an assembly including a fuel cell stack configured for converting chemical energy into electric energy and thermal energy using an electrochemical method. That is, the fuel cell module includes a fuel cell stack, a piping system through which fuel, oxide, coolant and emission are moved, a wire through which electricity produced by the stack is moved, a part configured for controlling or monitoring the stack, and a part configured for taking measures when an abnormal state of the stack occurs.

One aspect of the present disclosure relates to a structure of a fuel cell stack. The fuel cell stack may include a plurality of tubular or planar unit cells and a fuel cell module having a plurality of fuel cell stacks electrically connected to one another. Hereinafter, certain embodiments of the present disclosure will be described with reference to the accompanying drawings.

A unit cell will be described with reference to FIG. 1. FIG. 1 is a perspective view showing an embodiment of an interconnector-type unit cell. The unit cell 100 is a component configured to receive fuel reformed from a fuel converter (not shown) so as to produce electricity through an oxidation reaction. In the unit cell 100, a first electrode layer 101, an electrolyte layer 102 and a second electrode layer 103 are formed by being radially laminated from a central axis thereof. An interconnector 104 is formed to be exposed to an outside of the unit cell 100 such that the interconnector 104 is electrically connected to the first electrode layer 101. In this instance, the interconnector 104 is insulated from the second electrode layer 103 in such a manner that the interconnector 104 has an insulating material formed between the interconnector 104 and the second electrode layer 103 or is spatially spaced apart from the second electrode layer 103. That is, the unit cell according to this embodiment may be formed in an interconnector type based upon of its current collecting capacity, and may be formed in a tubular shape. However, the unit cell according to the present disclosure may also be formed in a flat-tubular shape. Here, the flat-tubular shape means a flat-tubular shape having a major diameter and a minor diameter.

The unit cell according to the present disclosure may be formed as an anode-supported unit cell or cathode-supported unit cell, but the present disclosure is not limited thereto. That is, the first and second electrode layers 101 and 103 may be an anode and a cathode, respectively. In other embodiments, the first and second electrode layers 101 and 103 may be a cathode and an anode, respectively.

The cathode is formed of a pure electron conductor or mixed conductor such as a $LaMnO_3$-based or $LaCoO_3$-based material, which has high ion and electron conductivity, stability under an oxygen atmosphere, and no chemical reaction with the electrolytic layer. The electrolytic layer is a portion configured to serve as a path along which oxygen ions produced through the cathode and hydrogen ions produced through the anode (which will be described later) are moved. The electrolytic layer may be formed of a compacted ceramic material to the extent that gas does not penetrate the ceramic material. The anode may be formed of a ceramic material such as YSZ. In some embodiments, a metal ceramic complex (cermet) such as NiO-8YSZ or Ni-8YSZ is used as the anode. Here, the metal ceramic complex (cermet) has a cheap price and good relative stability under a high-temperature reduction atmosphere.

Figure 2:
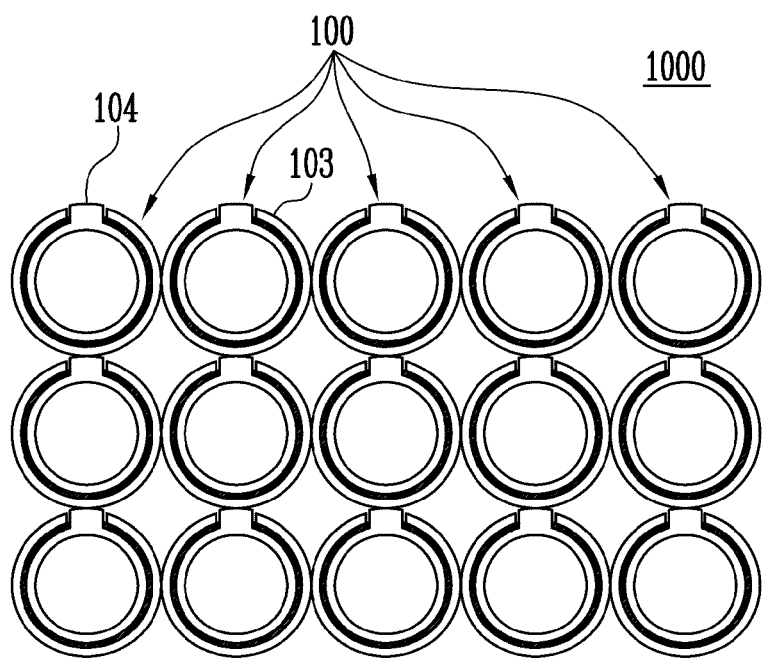
FIG. 2 is a plan view showing a cell array according to an embodiment of the present disclosure.

A state that the unit cells are electrically connected to one another will be described with reference to FIG. 2. FIG. 2 is a plan view showing a unit cell array 1000 having interconnector-type unit cells electrically connected to one another. As shown in FIG. 2, the cell array may be formed by connecting the unit cells 100 in series and/or in parallel. In the unit cell 100, the interconnector 104 serves as a first electrode, and the second electrode layer 103 exposed to an outer circumferential surface of the unit cell 100 serves as a second electrode. Thus, when the unit cells 100 are connected in series, the unit cells 100 are electrically connected so that the interconnector 104 of one unit cell 100 contacts the second electrode layer 103 of another unit cell 100. On the other hand, when the unit cells 100 are connected in parallel, the unit cells 100 are connected so that the second electrode layers 103 of two unit cells 100 electrically connected to each other are also in contact with each other. FIG. 2 shows a cell array 1000 in which the unit cells 100 are electrically connected in 3S5P (3 series 5 parallel).

Figure 3:
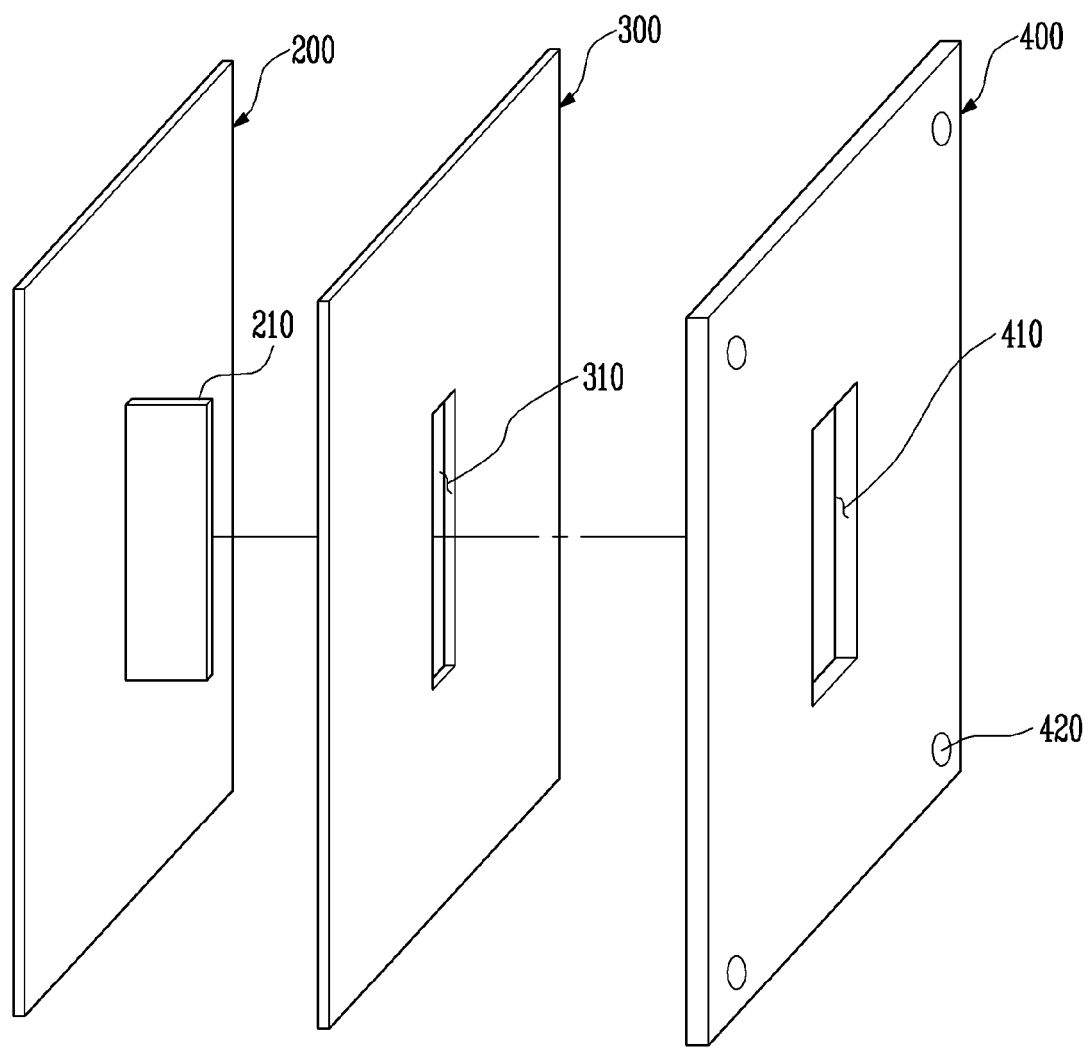
FIG. 3 is an exploded perspective view schematically showing a configuration for fixing a fuel cell stack according to the present disclosure.
Figure 4A:
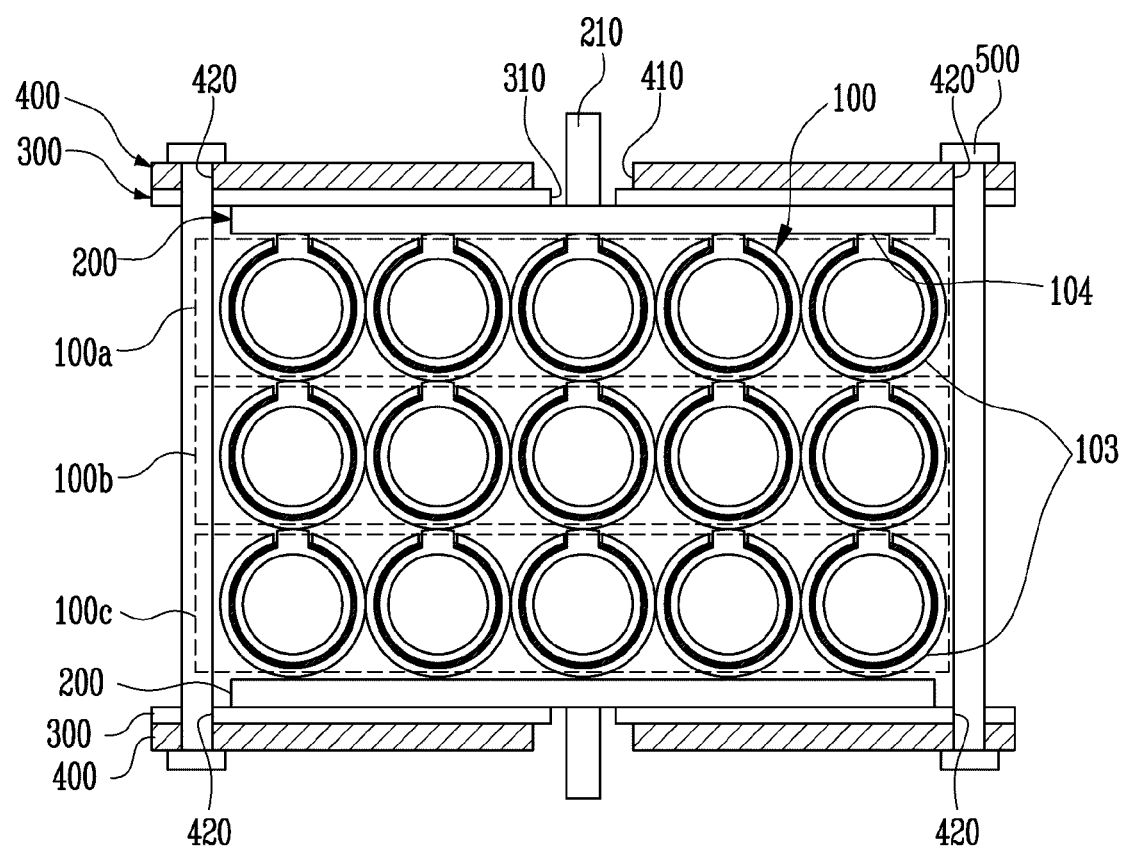
FIG. 4A is a cross-sectional view showing a fuel cell stack according to an embodiment of the present disclosure.

A bidirectional terminal type fuel cell stack according to an embodiment of the present disclosure will be described with reference to FIGS. 3 and 4A. FIG. 3 is an exploded perspective view schematically showing a configuration for fixing unit cells according to an embodiment of the present disclosure. FIG. 4A is a cross-sectional view showing a fuel cell stack according to the present disclosure. A current collecting member 200 is formed in a plate shape. The current collecting member 200 formed in the plate shape is advantageous in high-current collection as compared with a wire-shaped current collector. A terminal portion 210 is formed on one surface of the current collecting member 200. Similarly, the terminal portion 210 is preferably formed in a plate shape so that high current collected by the current collecting member 200 is effectively transferred to the outside through the terminal portion 210. The terminal portion 210 is provided to protrude in a vertical direction from one surface of the current collecting member 200. The current collecting member 200 and the terminal portion 210 may be formed of a single metal or alloy containing at least one of components, such as nickel (Ni) and silver (Ag), used as the conventional current collecting member.

The current collecting member 200 is provided to a cell array, for example, the cell array 1000 in FIG. 2, in which the unit cells are arranged in the 3S5P. In another example, five unit cells may be electrically connected in parallel to constitute one bundle in the cell array. The cell array may be arranged such that the unit cells are arranged in the 3S5P, like the cell array 10 illustrated in FIG. 4A. FIG. 4A has a structure in which three bundles 100a, 100b and 100c are electrically connected in series. In this instance, the current collecting member 200 is provided with a pair of current collecting members 200. One of the current collecting members 200 is configured to server as a first electrode by contacting the interconnectors 104 of unit cells constituting the first bundle 100a, and the other of the current collecting members 200 is configured to serve as a second electrode by contacting the second electrode layers 103 of unit cells constituting the third bundle 100c. Meanwhile, if the number of unit cells constituting one bundle is increased, the electric capacity of the fuel cell is also increased. If the number of bundles increases, the total voltage of the fuel cell also increases.

An insulating member 300 is formed as a plate-shaped electrical insulator. A first through-hole 310 is formed passing through both surfaces of the insulating member 300. A pair of insulating members 300 is provided to outsides of the current collecting members 200, respectively. In this instance, the terminal portion 210, which is electrically connected to the current collecting member 200, is exposed to the outside of the fuel cell by passing through the first through-hole 310. A fixing hole may also be formed in the insulating member 300 so that a fixing member 500 (which will be described later) can pass through the fixing hole. However, in a case where the insulating member has lateral and longitudinal lengths smaller than intervals between fixing holes formed in a holder 400 (which will be described later) it is unnecessary to separately form the fixing hole. In this case, the insulation effect can be maximized when the later and longitudinal lengths of the insulating member 300 are greater than those of the current collecting member 200 described above.

The holder 400 may be formed in a plate shape with a second through-hole 410 formed passing through both surfaces of the holder 400. A pair of holders 400 may be positioned to outsides of the insulating members 300, respectively. In this instance, the terminal portion 210 is exposed to the outside of the fuel cell by passing through both the first and second through-holes 310 and 410. The insulating member 300 is thus positioned between the holder 400 and the current collecting member 200 so that the holder 400 and the current collecting member 200 are electrically insulated from each other. The lateral and longitudinal lengths of the second through-hole 410 are preferably formed identical to or greater than those of the first through-hole 310, respectively, to prevent current from flowing in the terminal portion 210 and the holder 400 due to contact between the terminal portion 210 and the holder 400.

As illustrated in FIG. 3, four fixing grooves 420 are formed at an edge of the holder 400. Fixing members 500 may be inserted into the respective fixing grooves opposite thereto so as to fix and maintain an interval between the holders 400 using a screw fastening method, or the like. Although the configuration for fixing and maintaining the interval between the holders 400 has been described, the present disclosure is not limited thereto. That is, in a case where the rigidity of the insulating member 300 is sufficiently maintained at a high temperature, the holder 400 may be omitted and replaced with a configuration of a fixing member for fixing and maintaining the interval between the insulating members 300. Alternatively, the two holders 400 may be fixed by forming a recess having a female screw simply formed therein, instead of the fixing hole 420, in the holder 400 and then inserting a separate fixing member having screw threads respectively formed at both ends thereof into the recess. The number of the fixing holes 420 and the forming position of the fixing holes 420 are not particularly limited.

Figure 6:
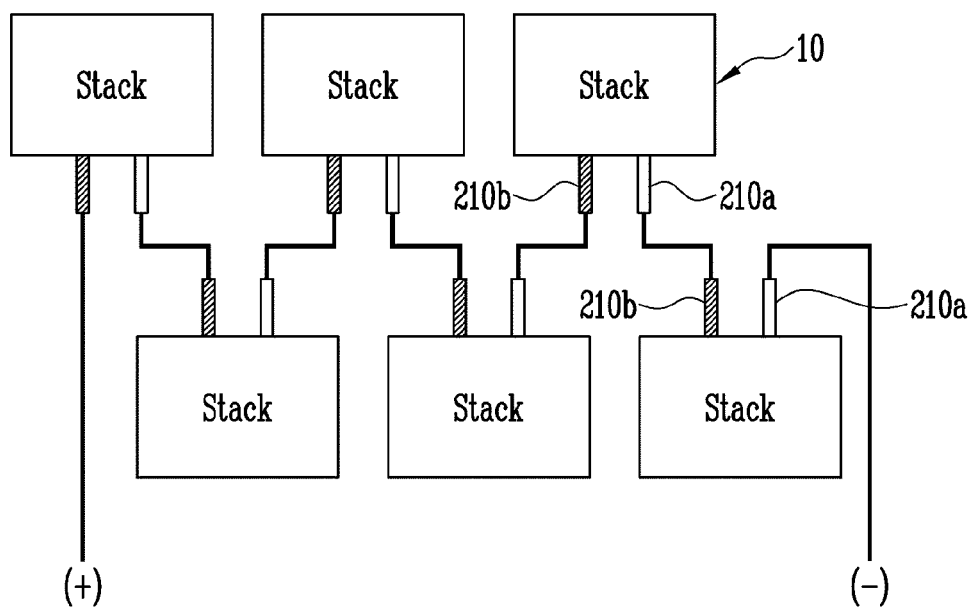
FIG. 6 is a schematic views showing fuel cell modules according to an embodiments of the present disclosure.

Meanwhile, the fixing member 500 may be replaced with an outer case 600, such as that illustrated in FIG. 6, which will be described later. The fixing member 500 may also be used together with the outer case.

Figure 4B:
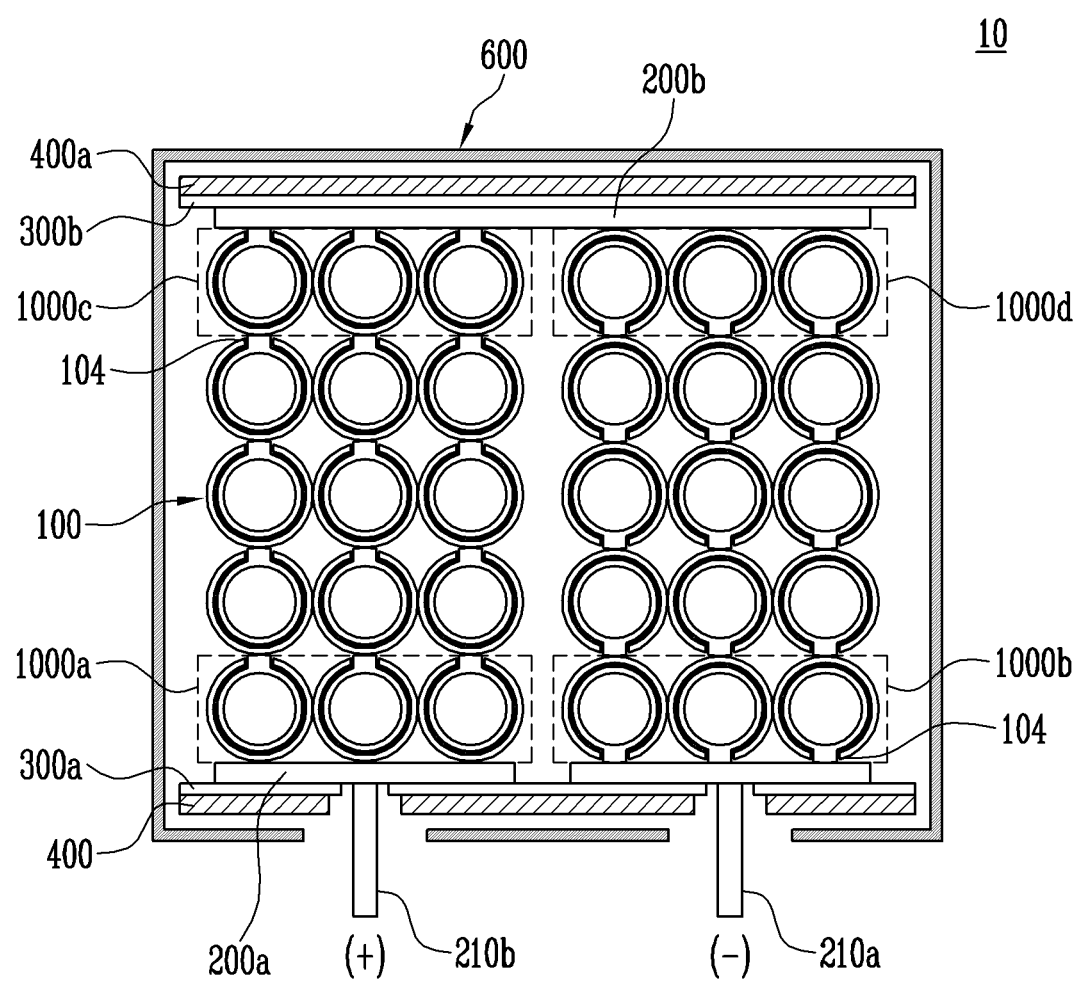
FIG. 4B is a cross-sectional view showing a fuel cell stack according to another embodiment of the present disclosure.

A unidirectional terminal type fuel cell stack according to an embodiment of the present disclosure will be described with reference to FIG. 4B. FIG. 4B is a cross-sectional view showing a unidirectional terminal type fuel cell stack according to an embodiment of the present disclosure. This embodiment is different from the embodiment described with reference to FIG. 4A in that first and second terminal portions 210*a* and 210*b* are formed on the same plane and an auxiliary current collecting member 200*b* is provided for the purpose of the configuration.

In a cell array 10 of this embodiment, the unit cells 100 are connected in 10S3P (10 series 3 parallel). In the aforementioned embodiments, all unit cells 100 constitute bundles, and the bundles are connected in series in a single direction. However, in this embodiment, interconnectors 104 of a first bundle 1000*a* to a fifth bundle 1000*c* are aligned upward in FIG. 4B, and interconnectors 104 of a sixth bundle 1000*d* to a tenth bundle 1000*b* are aligned downward. In this instance, current collecting members 200*a* respectively contact the first bundle 1000*a* and the last bundle 1000*c* in the serial connection of the bundles. An auxiliary current collecting member 200*b* is also provided to contact the fifth bundle 1000*c* and the sixth bundle 1000*d* on the same plane. In this instance, the auxiliary current collecting member 200*b* is positioned and may be configured to function as a serial connection among the bundles.

Meanwhile, first and second insulating members 300*a* and 300*b* are similar to those in the unidirectional terminal type fuel cell stack described above, except that positions of through-holes through which the respective first and second terminal portions 210*a* and 210*b* will pass are formed on only one side of the fuel cell stack. This is a similar structure as that illustrated for first and second holders 400 and 400*a*. An outer case 600 is also illustrated in FIG. 4*b*, which is configured to prevent the aforementioned components from being separated from the fuel cell stack and to isolate the aforementioned components from the outside. The outer case 600 is also configured to allow the first and second terminal portions 210*a* and 210*b* to be exposed to the outside thereof. The case 600 is insulated from the aforementioned current collecting member 200.

A unidirectional terminal type fuel cell stack according to another embodiment of the present disclosure will be described with reference to FIG. 4C. FIG. 4C is a cross-sectional view showing a fuel cell array 10*a* according to another embodiment of the present disclosure. This embodiment is different from the embodiment described with reference to FIG. 4B in that there are two auxiliary current collecting members 200*b* illustrated in FIG. 4C. In this embodiment, a cell array 10*a* includes unit cells 100 electrically connected in 20S3P (20 series 3 parallel). This embodiment is identical to the aforementioned embodiment described with reference to FIG. 4B in that the auxiliary current collecting member 200*b* is configured to function to assist the serial connection of the bundles by changing the arrangement and current flow direction of some of the bundles. However, in this embodiment, three auxiliary current collecting members 200*b* are provided so that the bundles are connected in series by changing the direction of some of the bundles three times in the entire fuel cell array 10*a*. That is, it can be seen that an odd-numbered auxiliary current collecting members 200*b* are provided so that the first and second terminal portions 210*a* and 210*b* can be formed in the same plane.

Meanwhile, in this embodiment, the unidirectional terminal type fuel cell stack can output a higher voltage as compared with the unidirectional terminal type fuel cell stack described with reference to FIG. 4B. However, to increase the electric capacity of the unidirectional or bidirectional terminal type fuel cell stack described above, it is sufficient to increase the number of unit cells constituting each of the bundles in the fuel cell stack.

Figure 5:
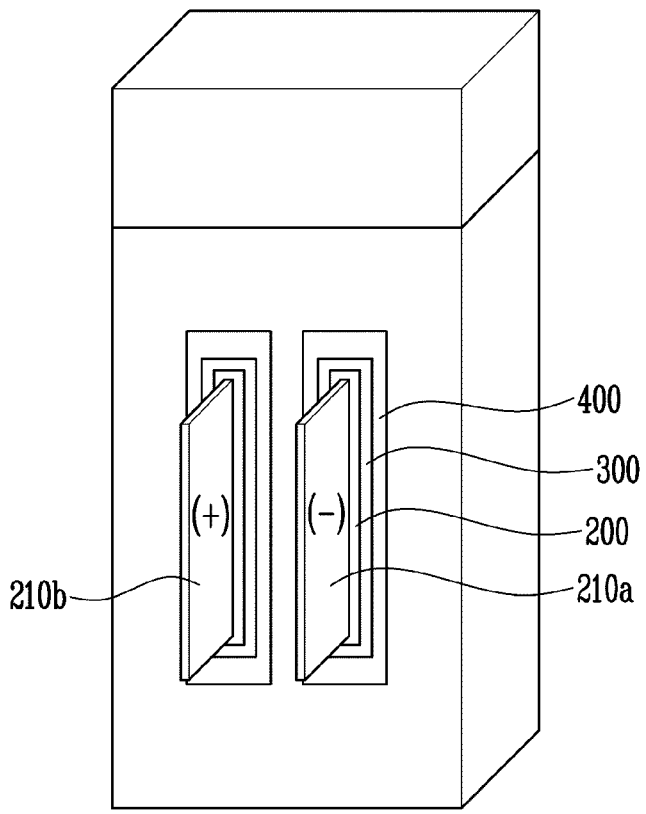
FIG. 5 is a perspective view showing a fuel cell stack according to an embodiment of the present disclosure.

A unidirectional terminal type fuel cell stack according to still another embodiment of the present disclosure will be described with reference to FIG. 5. FIG. 5 is a perspective view showing a fuel cell stack having an outer case. Similar to the FIG. 4B, the outer case 600 is positioned and configured to prevent the aforementioned components from being separated from the fuel cell stack and to isolate the aforementioned components from the outside. The outer case 600 may also be configured to allow the first and second terminal portions 210*a* and 210*b* to be exposed to the outside thereof. The case 600 may also be insulated from the aforementioned current collecting member 200.

Fuel cell modules having various electrical connection structures will be described with reference to FIGS. 6 to 11. FIG. 6 shows fuel cell modules each having only unidirectional terminal type fuel cell stacks 10 connected in series. In this case, the first terminal portion 210*a* of one stack 10 is electrically connected to the second terminal portion 210*b* of another stack 10 connected in series to the one stack 10.

Figure 7:
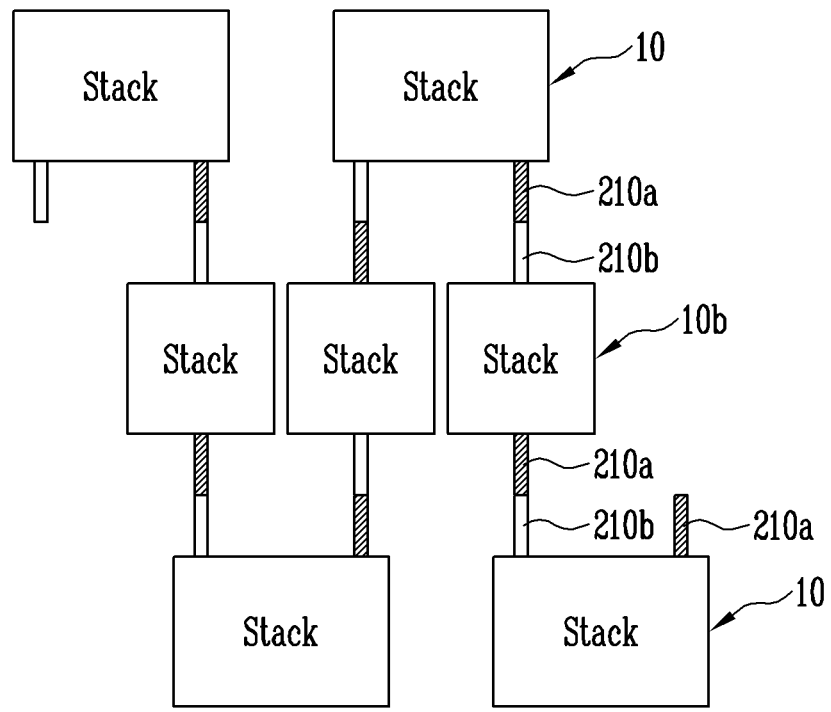
FIG. 7 is a schematic views showing fuel cell modules according to an embodiments of the present disclosure.

FIG. 7 shows a fuel cell module in which unidirectional and bidirectional terminal type fuel cell stacks 10 and 10*b*, respectively, are alternately connected in series. In this case, the embodiment of FIG. 7 is identical to that of FIG. 6 in that the first terminal portion 210*a* of one stack 10 or 10*b* is connected to the second terminal portion 210*b* of another stack 10*b* or 10 connected in series to the one stack. However, the embodiment of FIG. 7 is different from that of FIG. 6 in that the bidirectional terminal type fuel cell stacks are connected between the unidirectional terminal type fuel cell stacks 10.

Figure 8:
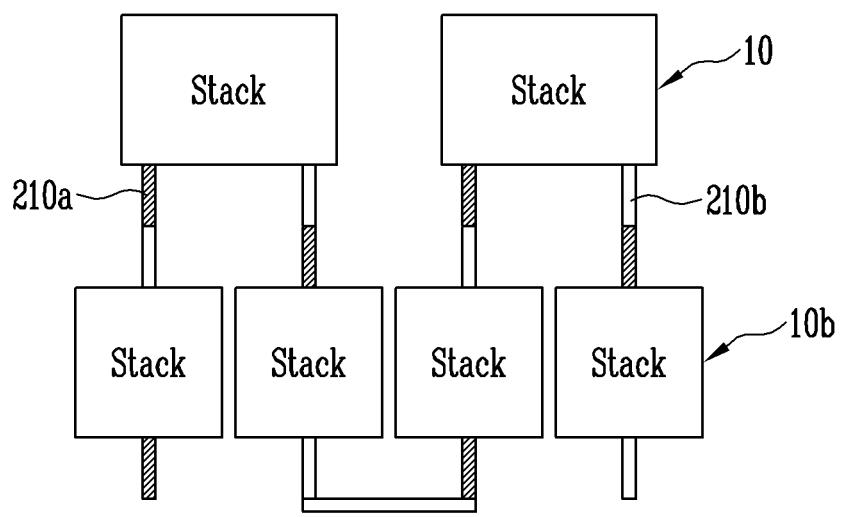
FIG. 8 is a schematic views showing fuel cell modules according to an embodiments of the present disclosure.

FIG. 8 shows a fuel cell module in which unidirectional and bidirectional terminal type fuel cell stacks 10 and 10*b* are connected in series. A unidirectional terminal type fuel cell stack 10 is connected between bidirectional terminal type fuel cell stacks 10*b*, and terminal portions of bidirectional terminal type fuel cell stacks 10*b* are connected in series. The electrical connections in FIG. 8 is similar to that of FIG. 7. However, the electrical connections of FIG. 8 is different from that of FIG. 7 in that the number of bidirectional terminal type fuel cell stacks 10 is decreased by a half. The fuel cell modules of FIGS. 7 and 8 may be selectively configured depending on a space in which the fuel cell module is to be installed. Electrical connections between unidirectional terminal type fuel cell stacks or bidirectional terminal type fuel cell stacks illustrated in the present application may include a wire or other suitable electrical connection.

Figure 9:
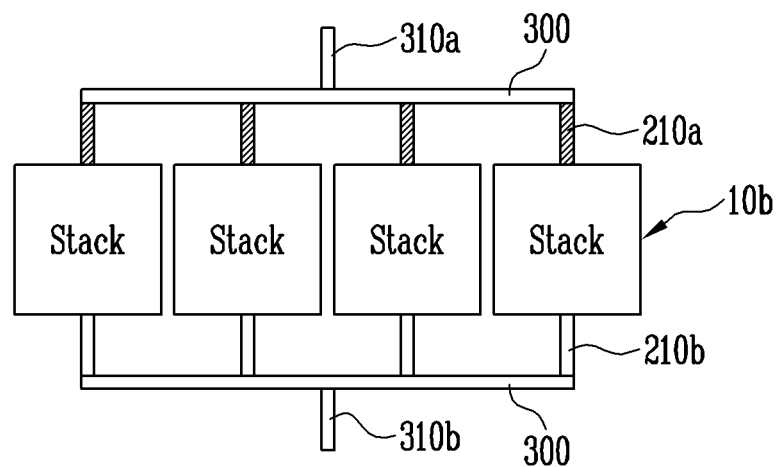
FIG. 9 is a schematic views showing fuel cell modules according to an embodiments of the present disclosure.

FIG. 9 shows a fuel cell module in which only bidirectional terminal type fuel cell stacks 10b are connected in parallel. A plurality of bidirectional terminal type fuel cell stacks 10b are provided. The direction of the terminal portions of the bidirectional terminal type fuel cell stacks 10b are arranged in a single direction, but the disclosure of the present application is not limited thereto. In this manner, the terminal portions 210a or 210b having the same polarity may be electrically connected to one another.

Figure 10:
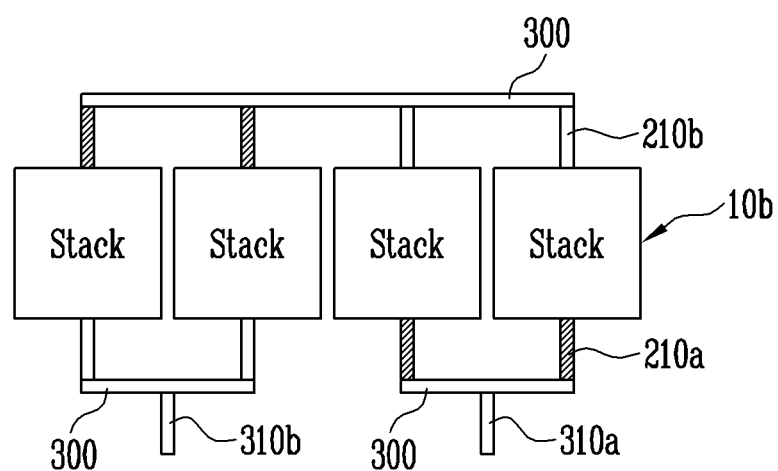
FIG. 10 is a schematic views showing fuel cell modules according to an embodiments of the present disclosure.
Figure 11:
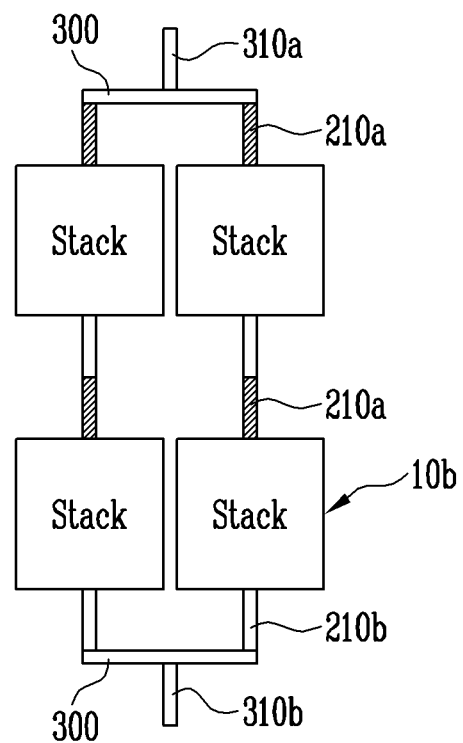
FIG. 11 is a schematic views showing fuel cell modules according to an embodiments of the present disclosure.

FIGS. 10 and 11 are schematic views showing fuel cell modules in which only bidirectional terminal type fuel cell stacks 10b are connected in combination of series and parallel electrical connections. The fuel cell modules shown in FIGS. 10 and 11 may be similar in terms of performance and function. Depending on the space for installation, therefore, either the fuel cell module structure in FIG. 10 or FIG. 11 may be used.

While the present disclosure has been described in connection with certain exemplary embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A solid oxide fuel cell stack, comprising:
a cell array having a plurality of bundles electrically connected in series, wherein each bundle includes a plurality of unit cells electrically connected in parallel;
first and second planar current collecting members electrically connected to the bundles;
first and second terminal portions respectively electrically connected to the first and the second current collecting members;
first and second insulating members respectively formed outside the first and the second current collecting members, wherein each insulating member has first through-holes through which the respective terminal portions pass;
first and second planar holders respectively formed outside the first and second insulating members; and
at least one fixing member penetrating the first and second planar holders and the first and second insulating members without penetrating either the first or the second planar current collecting members.

2. The solid oxide fuel cell stack of claim 1, wherein each of the plurality of unit cells comprises a first electrode layer, an electrolyte layer and a second electrode layer, sequentially laminated from an inside thereof, and an interconnector electrically connected to the first electrode layer and exposed to the exterior of the unit cell, wherein the interconnector is insulated from the second electrode layer, and wherein the first and second current collecting members electrically contact the interconnector and the second electrode layer, respectively.

3. The solid oxide fuel cell stack of claim 1, wherein the first and second planar holders are each formed with second through-holes through which the first and second terminals respectively pass.

4. The solid oxide fuel cell stack of claim 3 further comprising an outer case formed to surround outsides of the planar holders, the outer case having third through-holes through which the respective first and second terminal portions are exposed.

5. The solid oxide fuel cell stack of claim 1, wherein each unit cell is formed in a tubular or flat-tubular shape.

6. The solid oxide fuel cell stack of claim 1, wherein each terminal portion is formed in a planar shape.

7. The solid oxide fuel cell stack of claim 6, wherein each terminal portion protrudes in a vertical direction from the respective current collecting members.

8. A solid oxide fuel cell stack, comprising:
a cell array in which a plurality of interconnector-type unit cells are electrically connected in parallel to form bundles, and at least a portion of the bundles are electrically connected in series;
first and second planar current collecting members electrically connected to the serially connected bundles and configured to collect current;
a planar auxiliary current collecting member formed to electrically connect two bundles in the same plane;
first and second terminal portions respectively formed on the first and second current collecting members;
a first insulating member formed outside one portion of both the first and second current collecting members; and
a second insulating member formed on a side of the first insulating member opposite the planar auxiliary current collecting member,
wherein the first insulating member and the second insulating member are both formed having two through-holes through which respective first and second terminal portions pass.

9. The solid oxide fuel cell stack of claim 8, wherein each of the unit cells comprises a first electrode layer, an electrolyte layer and a second electrode layer, sequentially laminated from an inside thereof, and an interconnector electrically connected to the first electrode layer and exposed to the exterior of the unit cell, wherein the interconnector is insulated from the second electrode layer, and wherein the first and second current collecting members contact the interconnector and the second electrode layer, respectively.

10. The solid oxide fuel cell stack of claim 9 further comprising a first planar holder having second through-holes formed therein and positioned outside of the first insulating member; and a second planar holder formed outside of the second insulating member.

11. The solid oxide fuel cell stack of claim 8 further comprising fixing holes formed at corresponding positions of both the first and second planar holders; and a fixing member inserted into the fixing holes so as to provide a fixed distance between the first and second planar holders.

12. The solid oxide fuel cell stack of claim 9 further comprising an outer case formed to surround the exterior of the cell array and the first and second holders, the outer case having third through-holes through which the respective first and second terminal portions are exposed.

13. The solid oxide fuel cell stack of claim 8, wherein each unit cell is formed in a tubular or flat-tubular shape.

14. The solid oxide fuel cell stack of claim 8, wherein each terminal portion is formed in a planar shape.

15. The solid oxide fuel cell stack of claim 14, wherein each terminal portion protrudes in a vertical direction from the respective current collecting members.

16. A solid oxide fuel cell module comprising a plurality of solid oxide fuel cell stacks of claim 8, wherein the plurality of solid oxide fuel cell stacks comprise unidirectional and bidirectional terminal types, and wherein the bidirectional terminal type solid oxide fuel cell stacks are electrically connected in series.

17. A solid oxide fuel cell module comprising bidirectional terminal type fuel cell stacks and unidirectional terminal type fuel cell stacks, wherein the bidirectional terminal type fuel cell stacks comprise the solid oxide fuel cell stack of claim 1, wherein the bidirectional and unidirectional terminal type fuel cell stacks are alternately and electrically connected in series.

18. A solid oxide fuel cell module comprising bidirectional terminal type fuel cell stacks, wherein the bidirectional terminal type fuel cell stacks comprise the solid oxide fuel cell stack of claim 1, and wherein the bidirectional terminal type fuel cell stacks are electrically connected in series and in parallel.

* * * * *